April 9, 1935.  B. M. RANDALL ET AL  1,997,344
COMPOSITE BOARD AND BOX MADE THEREFROM
Filed March 21, 1933
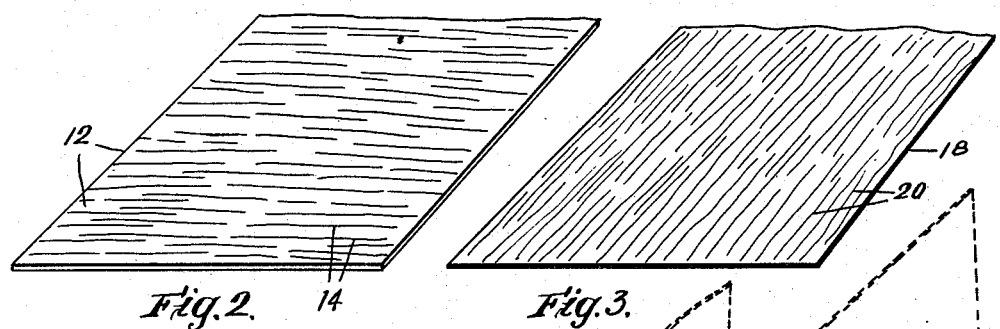
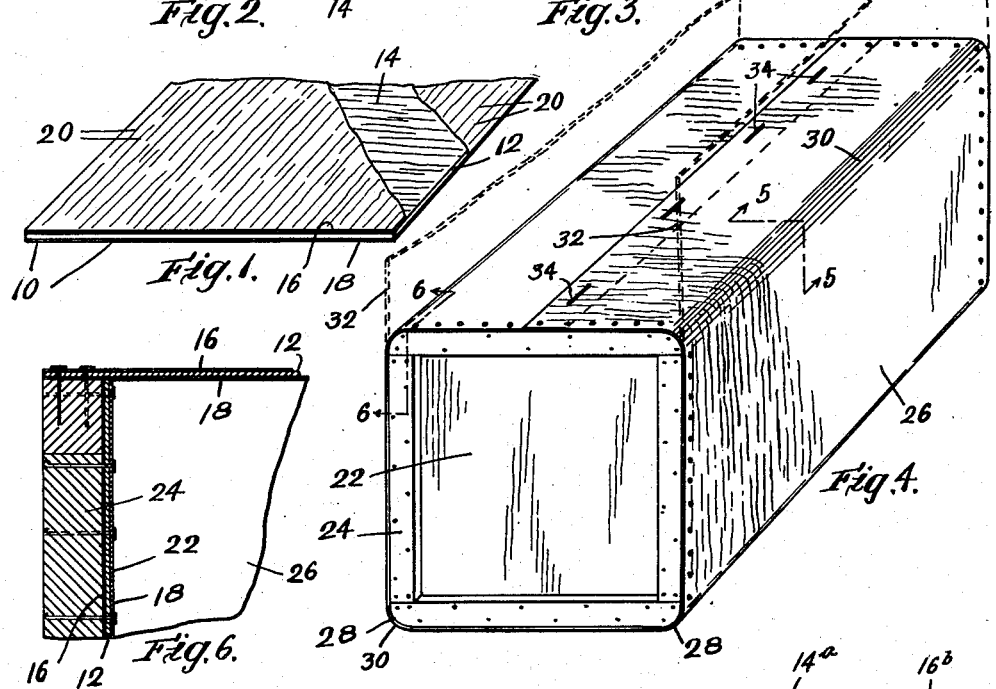
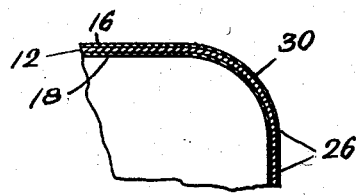
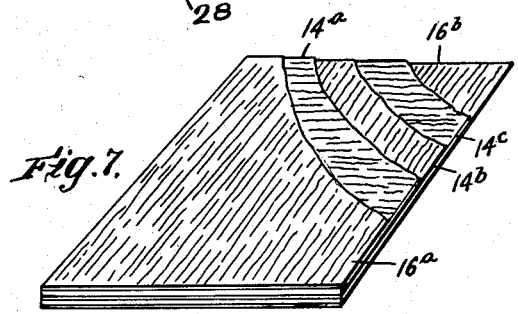
Inventors.
Boardman M. Randall
Harry N. Knowlton Patented Apr. 9, 1935

1,997,344

UNITED STATES PATENT OFFICE 1,997,344

COMPOSITE BOARD AND BOX MADE THEREFROM

Boardman M. Randall, Portsmouth, N. H., and Harry N. Knowlton, South Duxbury, Mass., assignors to St. Croix Lumber Company, Boston, Mass., a corporation of Massachusetts Application March 21, 1933, Serial No. 661,914

4 Claims. (Cl. 217—5)

This invention relates to an improved composite board, which we call kraft wood, suitable for many purposes but particularly suitable for boxes, and to a box made from such board.

For many years a common material for boxes has been a plywood composed of three layers or plies of veneer superimposed to make virtually a single board. This three-ply veneer board is strong and is both lighter and cheaper than a single board of the same strength, so that boxes made from it are not only cheaper than boxes made of single boards of the necessary strength but are lighter and so cost less to ship. This plywood, however, has well known limitations, particularly its limited flexibility which causes it to break with a splintering crack under strains likely to be met in practice, and its tendency to warp.

We have invented a composite board that is well adapted for most of the uses to which plywood has been put, especially boxes, and for many uses for which plywood is not so readily, if at all, suitable. As adapted for box purposes, our composite board is much lighter and thinner and less expensive than plywood and is sufficiently flexible to be shaped around the round corners of boxes without scoring or cutting and yet is surprisingly rigid and strong.

Our composite board consists specifically of a core of wood veneer, interposed between and combined with outer sheets of cylinder kraft. The advantages of our composite board are secured largely by the particular kind of kraft we employ and the manner in which the layers are combined, though the comparative thickness of the layers also is important. Our composite board consists of an inner layer or core of ordinary wood veneer, which may be a rotary cut veneer, and external layers of kraft board of a special kind which we will call herein "cylinder kraft" though we do not limit ourselves to the manner in which the kraft board is made.

This cylinder kraft board has a distinct grain. It has a high resistance to flexing in one direction, which we call across the grain, that is, across the board, and a low resistance to flexing in the other direction, that is lengthwise of the grain, or the board. Yet it can be folded on itself either with or against the grain without breaking. It has a high resistance to tearing across the grain and a lower resistance to tearing in the other direction, that is lengthwise of the board. The lower resistance to tearing with the grain is not an advantage so far as we know, but kraft board of the required qualities as a whole must have great strength across the grain. There is a resulting weakness against tearing in the other direction, which does no harm.

This result is accomplished by making kraft board on a cylinder machine or series of cylinder machines and combining the resulting sheets. Such board, owing to the manner it is made, has a distinct grain. Its fibres lie lengthwise to a considerable extent. It is much stronger against tearing across the grain than against tearing lengthwise of the grain.

Kraft is usually made at high speed on a Fourdrinier machine and when so made has not the necessary grain for our purpose. Fourdrinier kraft may be strong or stronger than cylinder kraft if torn lengthwise of the sheet rather than across, a balanced sheet being desired for many purposes for which kraft is used.

The cylinder kraft for our kraft wood should be practically all sulphate, which has long strong fibres that are practically unmodified wood fibres. The long strong fibres of the sulphate stock give great strength to tearing across the grain. Furthermore, the sheet should be run through heavy calenders to consolidate it.

The cylinder kraft board so made when .016 inch thick may have a Mullen test of 215. It may have a resistance to tearing across the grain of 696 grams (Elmendorf test) and a resistance to tearing with the grain 328 grams. Little resistance in that direction is necessary.

Fourdrinier all sulphate kraft board of the same weight and thickness gave a Mullen test 130 and tearing tests (Elmendorf) of 560 with the grain and 576 against the grain.

It will be noted that the average of the tearing tests with and against the grain seems to show a slightly greater resistance in the Fourdrinier kraft, which presumably made this Fourdrinier kraft better for many purposes, but the Mullen test shows the cylinder kraft to be far superior in resistance to puncturing, a surprising result, as the board having the lowest tearing strength either way might be expected to puncture first, just as a chain depends on the weakest link.

The foregoing tests are given to show the general characteristics of cylinder kraft. Different samples of same weight and thickness will give different results and different weights and thicknesses will give widely different results, not always proportional.

The cylinder kraft we refer to shows a material grain; a high resistance to tearing across the grain and a Mullen test better than Fourdrinier kraft of the same weight and thickness. Fourdrinier kraft made as at present or by any method which may be devised which does not have a decided grain is not included in our invention.

The veneer which forms the interior ply of our kraft wood may be of any suitable veneer. That now used in making the ordinary three-ply plywood for boxes is entirely satisfactory. Veneer .05 inches thick makes a very satisfactory interior for our kraft wood.

The cylinder kraft is preferably waterproofed by introducing any suitable or usual water proofing medium into the beater with the sulphate fibres, following the customary practice. Preferably the sheet is given a smooth surface at least on one side by drying rolls and the like and the other side of the sheet is left relatively rough; and the rough side of the sheet is applied to the wood veneer.

The cylinder kraft boards and the wood veneer are combined with a glue or any suitable adhesive with the wood veneer in the middle and the kraft boards adhesively affixed to the opposite faces of the wood veneer.

In accordance with our invention the grain of the kraft boards must extend across the grain of the wood veneer. Several things are accomplished by this crossing of grains. Two faults of veneer wood are its tendency to splinter and to warp. Cylinder kraft has long fibres and they are stiff and springy and lie parallel. The splinters of veneer are also long. Now if each long fibre of the veneer wood is held down by many long fibres of kraft and each long fibre of kraft is anchored for a long distance each side of a fibre of wood, the anchorage is much stronger than would be given by fibres irregularly placed. This we have found to be true. Veneer combined with Fourdrinier kraft is of little value as a strengthener however placed. As to warping, our kraft wood is surprising in its effects. Veneer is commonly cut from a round log and curls up on an axis parallel to the axis of the log as would be expected. Cylinder kraft is rolled up and stored in a roll like a log, often for a long while. But it does not curl up when unrolled. When veneer is combined with kraft across the grain, the axis of the curl of the veneer and of the roll of kraft are parallel though the grain is crossed. Nevertheless the kraft prevents warping of the veneer. This is true only if cylinder kraft is used and is used on both sides of the veneer wood.

Fig. 1 is a perspective detail of the kraft wood embodying the present invention.

Figs. 2 and 3 are similar perspective details of the separate sheets that are combined to form the kraft wood of Fig. 1.

Fig. 4 is a perspective view of a box embodying the invention.

Fig. 5 is a sectional detail taken along line 5—5 of Fig. 4.

Fig. 6 is a sectional detail taken along line 6—6 of Fig. 4.

Fig. 7 is a perspective detail of a modified form of our composite board wherein the core consists of a plurality of layers of wood veneer between cylinder kraft layers.

Fig. 1 illustrates a section of a flat sheet 10 of composite veneer embodying the invention which we call kraft wood. The kraft wood comprises a middle layer or core 12 of any ordinary wood veneer sheet, which may be a rotary cut veneer sheet, having the grain extended from right to left as illustrated by the grain marks 14. Sheets or layers 16 and 18 of cylinder kraft board, preferably made water-proof, are applied to the opposite faces of the wood veneer core with the grain of the kraft boards, as illustrated by the grain marks 20 of said boards, extending across the grain of the wood veneer. A section of the wood veneer core 12 is illustrated in Fig. 1 and one of the two similar cylinder kraft sheets 18 in Fig. 3. The sheets are or can be combined in any manner customary in combining wood veneer, the layers being united by glue or other proper adhesive in any suitable manner under heavy pressure. It will be found that the cylinder kraft does not absorb so much glue as veneer and therefor less glue is required for the combination. The sheets of our kraft wood can be combined in substantial lengths especially when the core sheet is a rotary cut veneer since a long continuous length of the veneer is cut from the log. The cylinder kraft also is made in long lengths. A rotary cut veneer has a tendency to curl on an axis parallel to its grain since it is removed as a continuous sheet from the surface of a rotating log. The cylinder kraft although stored in roll form for many months before it is combined with the veneer core, does not exhibit the tendency to assume the curve of the roll when unwound therefrom, as is very decidedly the case with the usual paper sheet, so that a portion of the kraft sheet from any section of the roll may be combined with any portion of the length of wood veneer. The kraft sheets have the property of holding the wood veneer against its latent tendency to curl, and also against any subsequently acquired tendency to curl, so that the kraft wood is flat and has no material tendency to warp with ordinary use. The fibres of the kraft board seem to act like flat springs in maintaining the kraft wood flat. The kraft wood can be made approximately to some specified dimension and thereafter trimmed to the precise dimensions, or pieces of the kraft wood of the proper dimensions can be cut from a bigger sheet. The kraft wood may be made in long strips and shipped in lengths of any desired size subject to the limitation that the veneer can not conveniently be obtained more than six or seven feet wide and that there is a limit to the convenient width for the cylinder kraft. The thickness of the kraft and veneer sheets can be anything desired. For making packing boxes and the like the kraft wood is highly satisfactory when the kraft sheets have a thickness of .016 inch and the wood veneer has a thickness of 1/20 inch. These dimensions can be varied, however, to suit particular requirements. The veneer can even be $\frac{1}{10}$ inch with kraft boards .016 inch and yet the kraft wood is sufficiently flexible for box purposes. With a veneer of greater thickness than $\frac{1}{10}$ inch it will usually be desirable to increase the thickness of the kraft boards. Increasing the veneer thickness much over $\frac{1}{10}$ inch will not show correspondingly increased strength of the kraft wood, however, as the wood fibres then become too strong to be controlled by the kraft board. A very thin veneer, say 1/30 inch or 1/40 inch can also be used for some purposes, preferably in combination with thinner kraft boards. The flexibility of the kraft wood is not greatly affected by reasonable variations in thickness of the kraft boards.

As above described, there would be no broken joints, so to speak, in the completed material. We have found, however, that the strength of the product is not seriously impaired by the fact that there may be a joint of the veneer extending across the material, the joint preferably extending across the grain of the kraft sheets. The joint can be taped with paper in the usual manner, for convenience in handling the veneer, but the taping is not necessary for strength.

Cylinder kraft board of a thickness most desirable for forming our kraft wood is usually made by combining a plurality of kraft paper layers in the manufacture by using the product of four more or less cylinders combined. It may be possible to use an adulterated cylinder kraft board for forming our kraft board, wherein the adulterant may be one or more sheets that is not cylinder kraft, that is to say, does not have a pronounced grain. Such adulterated paper board, as an entirety, must have a marked grain and much greater resistance to flexing and tearing in one direction than in a direction at right angles thereto, for use in our invention. Obviously an unadulterated cylinder kraft board is preferred.

Our invention also comprehends a composite board consisting of three or more plies of wood veneer, the interior ply being thicker than the outer plies. Such plywood is now sold and called plywood panelling and makes a very good wall-board but has a tendency to warp.

We have found that by placing an exterior ply of cylinder kraft of approximately 1/60 inch thickness outside of such plywood panelling so as to cross the grain a very good wall-board is made. Fig. 7 illustrates this modification of the invention wherein 14a, 14b and 14c represent the three plies of wood veneer laid with the grains crossed, the middle ply 14b being thicker than the outer plies 14a and 14c, and 16a and 16b represent the cylinder kraft sheets with the grains parallel and laid across the grains of the sheets 14a and 14c. This product is not like kraft wood as it is not practicably flexible but it is very strong and has little tendency to warp and makes a valuable wall-board.

In Figs. 4 through 6 is illustrated a packing box incorporating the present invention and composed of the composite board herein described and specifically the kraft wood of Fig. 1. Said box comprises ends 22 of rectangular configuration except that the corners are rounded off, and consisting of a section or sheet of our kraft wood secured as nailed to the inner face of a rectangular wood frame 24 as illustrated in Fig. 6. The long sides of the box comprise a sheet 26 or several sheets joined end to end, if the box is very large, of our kraft wood wrapped around and nailed or otherwise secured at its side edges to the end frames 24. The grain of the veneer core should be parallel to the long sides of the box. The end frames have rounded corners 28 of such radius that the sheet 26 can be wrapped therearound readily, thereby forming round corners 30 at the meeting sides of the box. The ends 32 of the sheet 26 can be left upright as indicated by the dotted lines, Fig. 4, until the box is packed and then the ends can be folded down upon the end frames 24 in overlapping relation to form a tube and secured to each other and to the frames. The overlapping ends can be secured together in any suitable or convenient manner as by an adhesive, a row of metal fasteners 34, or the like. The box thus made is easily and cheaply constructed, is light in weight, and yet is surprisingly strong and rigid. An empty box similar to that illustrated in Fig. 4, and approximately one foot square and 20 inches long and composed of our kraft wood having a center veneer core 1/20 inch thick and outer cylinder kraft sheets .016 inch in thickness will easily support the weight of two heavy men standing upon one of the flat sides of the box without rupture or harmful distortion.

We claim:

1. As an article of manufacture a composite board whose cooperative elements consist of an intermediate layer of wood veneer thin enough to flex readily in one direction and a paper sheet adhesively secured substantially throughout its entire area upon each side of said veneer, each paper sheet being characterized by having a major tensile strength in one direction due to the presence of a considerable majority of fibres running in that direction and showing a pronounced grain, the pronounced grain of each sheet being disposed approximately at right angles to the grain of the veneer.

2. As an article of manufacture a composite board made up of an intermediate layer of wood veneer thin enough to flex readily in one direction and a sheet of cylinder kraft paper adhesively secured throughout substantially its entire area upon each side of said veneer, each sheet of cylinder kraft paper being characterized by having a major tensile strength in one direction due to the presence of a substantial majority of the fibres running longitudinally of the sheet and showing a pronounced grain, the pronounced grain of each sheet being disposed approximately at right angles to the grain of the veneer.

3. A packing box consisting of two supporting end frames closed by panels, a composite board made up of an intermediate layer of wood veneer thin enough to flex readily in one direction, and a paper sheet adhesively secured substantially throughout its entire area upon each face of said veneer, each paper sheet being characterized by having a major tensile strength in one direction due to the presence of a substantial majority of fibres running in that direction and showing a pronounced grain, the pronounced grain of each sheet being disposed approximately at right angles to the grain of the veener, said board connecting said end frames to form a box and being bent along a plurality of lines to make abrupt turns around the corners of the box, with the grain of the paper sheets transverse to said lines and said majority of fibres traversing the corners of the box to form hinges.

4. A packing box consisting of two supporting end frames closed by panels, a composite board made up of an intermediate layer of wood veneer thin enough to flex readily in one direction, and a cylinder kraft paper sheet adhesively secured substantially throughout its entire area upon each face of said veneer, said cylinder kraft paper sheets being characterized by having a major tensile strength in one direction due to the presence of a substantial majority of fibres running in that direction and producing a pronounced grain, the paper having a much greater resistance to tearing across the grain than with the grain and having the grain of the paper disposed approximately at right angles to the grain of the veneer, said board being flexed about and connecting said end frames to form a box, with the grain of the cylinder kraft sheets transverse to the lines of flexure of said board and said majority of fibres traversing the corners of the box to form hinges.

BOARDMAN M. RANDALL.
HARRY N. KNOWLTON.